Oct. 29, 1957          A. ODENWALD          2,811,611
SMALL-TYPE THERMOSTAT FOR PREVENTING OVERHEATING
IN ELECTRICAL APPARATUS

Filed April 17, 1956          2 Sheets-Sheet 1

INVENTOR:
Alfred Odenwald
By: Michael S. Struker
agt.

2,811,611

SMALL-TYPE THERMOSTAT FOR PREVENTING OVERHEATING IN ELECTRICAL APPARATUS

Alfred Odenwald, Pforzheim, Germany

Application April 17, 1956, Serial No. 578,743

8 Claims. (Cl. 200—138)

This invention relates to a thermostat, and is particularly directed to a small thermostat for preventing overheating in electrical apparatus as well as in windings of machines and transformers, and which is provided with a curved bimetal disk suported in its position at the rim of the casing.

Modern series production of automatic and remote-controlled electrical appliances, and also the construction of windings for electro-motors and transformers, necessitate not only the economic use of material and, therefore, of constantly smaller and lighter designs, but also brought with them a desire for higher standards of reliability in order to reduce to a minimum of risk the guaranties to be given for the finished products. Thus, it is necessary, when unexpected disorders occur, to protect the electrical apparatus from damage or to supervise or regulate fixed operational temperatures, and it is further necessary to effect automatically the necessary switching on and off of current after the desired temperatures have been obtained, in order to facilitate in this way the duties of the service staff.

For this purpose there have been employed already expensive regulating devices of the most varied type, and also less expensive and simpler temperature-regulating switches operating on the known thermo-bimetal principle. These devices were required to be arranged in close proximity of the media to be regulated. The transfer of heat from these to the temperature regulator is effected generally by metal heat conductors or, in case of an airgap between the medium and the temperature regulator, by means of radiation. It is obvious, therefore, that in constructions of this type only the comparison temperature in the heat gradient could be used for automatic heat regulation.

The thermo-bimetal type of regulator provided with extra finely regulating slowly progressing switching action causes through too much on and off switching of the heating or working current, and also through flickering of the contacts, resulting from slight welding to each other of the pairs of contacts in the arc, undesired radio disturbances. The known temperature regulators operating on the Klixon principle and provided with bimetal disks which suddenly snap into the opposite direction when the desired heating or cooling has been reached, take up too much space owing to the customary securing of terminals in the center of the disk. The further known lateral arrangement for securing terminals provides a greater interval between the interruptor contacts. However, the construction involved is too bulky to permit of producing temperature regulating switches of a size small enough for certain requirements.

The purpose of the small thermostat in accordance with the present invention is to obviate these disadvantages. The familiar construction of the Klixon regulator was thereby abandoned and the rigid connection of the bimetal element to the casing was dispensed with.

According to the invention this is achieved by the feature that the bimetal disk conducting the current carries in its center a contact, preferably a contact stud of high-grade contact material. In addition to this, the cable leads are so arranged on the slightly curved side of a sealed, lense-shaped, dustproof, water-tight casing of well-conducting metal, that one of the cable leads is conductively connected via the casing with the bimetal disk, whilst the second lead which is insulated from the casing carries the counter-contact, whereby at least one of the cable leads is rotatably mounted.

When, in accordance with the invention, the small thermostat is employed in electrical apparatus subject to rising temperatures when in action, as for example, the winding coils of electrical machines, the small thermostat is wound into the coil and, through immersion in insulating varnish or in insulating mass, formed with the coil to a compact mass devoid of air-spaces.

By this arrangement it is possible to dispense entirely with heat transfer by radiation or by means of metal heat conductors, and consequently with disadvantages, such as loss of heat and delay in transfer of heat, since the thermostat, due to the absence of insulating air-spaces and of losses of all kinds, immediately receives at all times the temperatures of the mass enclosing it, and is thus capable of switching on and off current without temperature loss or lag.

In order to assure, apart from good contact making at the actual switch point, an efficient current transfer at the edges of the bimetal disk with its flanged mounting even in the case of fairly high outputs and without sparking or destructive or corrosive symptoms, the small thermostat of the invention may be provided additionally with a flexible current lead for electrically relieving load on the stud, and which connects the contact in the center of the bimetal disk with the casing. Here, a metal spider of sun-wheel shape is preferably employed, which is conductively connected, on the one hand, to the contact of the bimetal disk, and, on the other hand, in the "on" position, to the casing. Thus, the current passes via the contact and the well-conducting lead to the casing, and no longer via the bimetal disk. Since in this case the bimetal disk is also relieved from self-heating by heat produced by the current, an increase in efficiency and in sensitivity is obtained. The efficiency of such miniature devices for prevention of overheating is increased some ten-fold, and their operational life, some one hundred-fold. Thus, these small thermostats can be employed not only for controlling automatic safety coils of 20 to 40 watts, but may be employed for the direct switching of numerous domestic electrical appliances and other small motors for direct and for alternating current.

Finally, the counter-contact on the casing may be adjustable relative to the contact of the bimetal disk by employing insulating plates of varying thickness, so that the initial tension of the bimetal disk, and consequently also the contact pressure, is variable.

By suitable choice of thickness of an insulating plate arranged beneath the counter-contact insulated from the casing, the contact pressure, and consequently also the initial tension of the bimetal disk, is widely adjustable. Thereby the "switch-off" temperature can also be varied, as increase of the contact pressure reduces the switch-off temperature, while reduction of the contact pressure increases the switch-off temperature. Thus, with a high initial tension of the bimetal disk a lower surrounding temperature must exist in order to cause the disk to snap into the "off" position. In the same way, with lower initial tension or with complete absence of initial tension, the same disk will snap into the "off" position with a higher surrounding temperature.

In order to accommodate this characteristic of the bimetal disk according to the invention, the dust-proof and water-tight flanged-over upper portion of the casing may be provided with a central curved portion directed towards the interior of the casing, whereby the depth of the curved portion is variable. This curve may be lowered to give the desired time interval, so that the bimetal disk, even after the switching operation has occurred, once again has the particular initial tension required for certain pre-determined "switch-on" temperatures.

Moreover, by suitable arrangement of counter-contacts on either side of the regulator contact of the bimetal disk, the small thermostat according to the invention may also be employed as a temperature-governed reversing switch. For this purpose, the bimetal disk located in the casing should preferably be provided with heavy duty contacts fitted on either side of the center of the disk.

Finally, in order to reduce the weight, the sheet-metal casing may be produced from material only approximately half as thick, if beryllium copper is used. In this case, the same axial load may be applied to the casing whilst economising approximately one third of the weight. Since beryllium copper can be heat-tempered to various tensile strengths like steel, and since it possesses practically the same conduction and heat-transfer values as copper, the suitability of the present overheating safety device for rapid acceptance of the surrounding heat is further increased by the lower heat capacity.

Embodiments of the small thermostat in accordance with the invention are illustrated by way of example in the drawings, in which.

Figure 1:
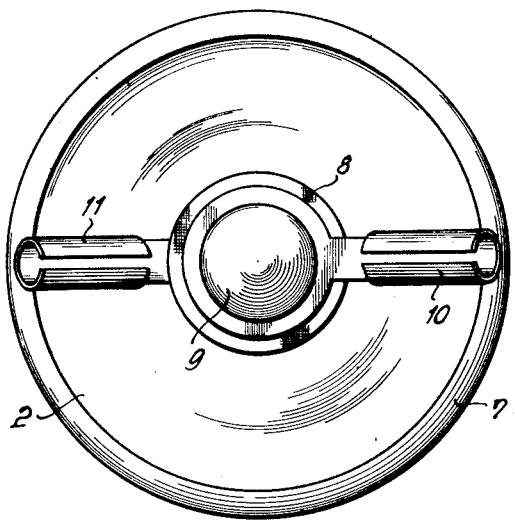
Fig. 1 is an underneath plan view of a first embodiment of the small thermostat.

Referring now to the drawings in detail, in the first embodiment the lower portion 2 of the casing embraces, by means of its rim 3, the bimetal disk 4 which carries at its center the contact 5. The casing portion 6 embraces the part 2 by means of the flanged-over edge 7. Located in a recess of the casing portion 2 is the fixed or counter-contact 9, which is electrically isolated from the casing by an insulating plate 8, and which is connected to cable lead 10. The cable lead 11 is in direct electrical contact with the casing.

Figure 2:
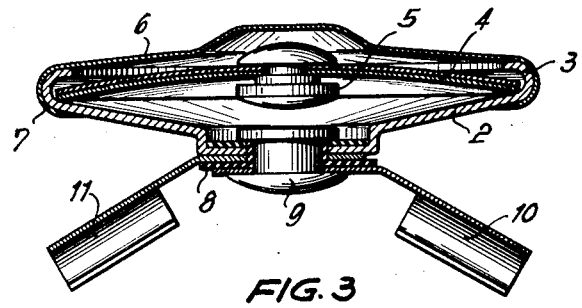
Figs. 2 and 3 show central cross-sections of the small thermostat as in Fig. 1, in the open and closed contact position, respectively.
Figure 3:
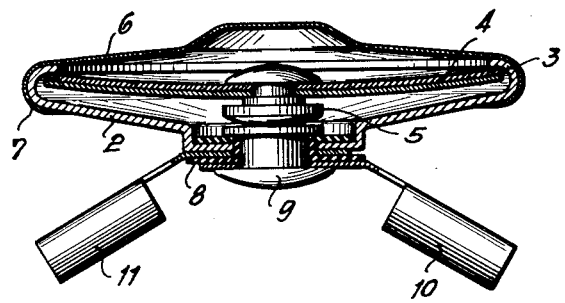
Figure 6:
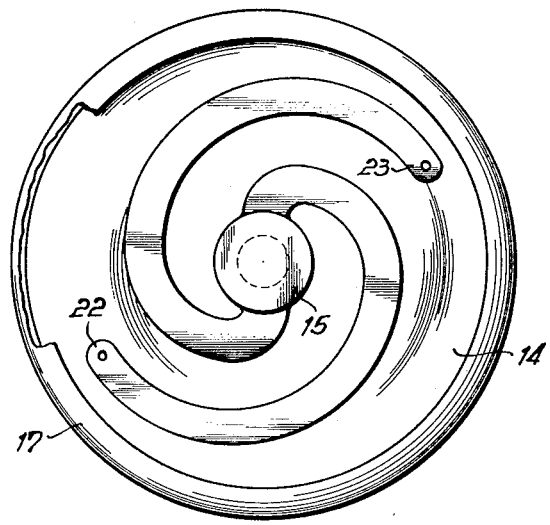
Fig. 6 is a view from beneath into the casing, as shown in Figs. 4 and 5.

At the selected temperature the bimetal disk 4 snaps from the position shown in Fig. 2 to that shown in Fig. 3. The contacts 5, 9 are now under mutual contact pressure because of the counter-pressure produced on the casing rim by the tensioned bimetal disk 4. At this point, the circuit from cable lead 10 via contacts 9, 5, disk 4, casing portion 2, to the cable lead 11, is closed.

Cable lead 11 may alternatively be located on casing portion 6, instead of on casing portion 2; i. e. on the opposite side from that shown here. It should further be noted that the cable lead 10 may also be rotatably fitted, for the sake of ease in assembling.

In the second embodiment the lower casing portion 12 has, as in the previous case, a rim 13 in which the contact disk 14 is located which carries the contact 15 at its center. The upper casing portion 16 embraces the casing part 12 by means of the flanged edge 17. In a recess in the casing portion 12 the counter-contact 19 is located which is electrically isolated from the casing by insulating plates 18, and which is connected to a cable lead 20. The cable lead 21 is in direct electrical contact with the casing.

Figure 4:
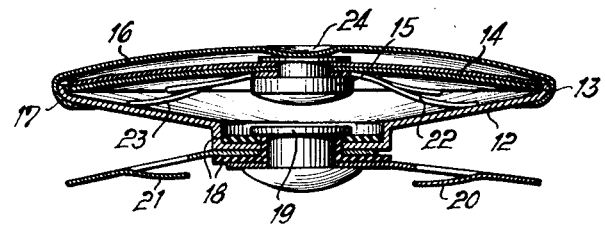
Figs. 4 and 5 are central sections through the second embodiment of the thermostat, showing different operating positions.
Figure 5:
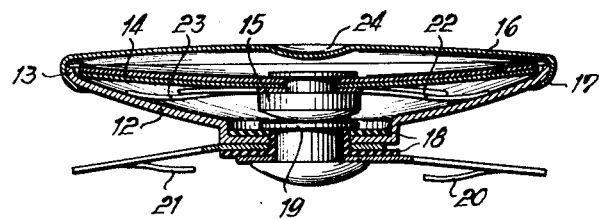

On reaching the temperature considered to be admissible, the contact disk 14 snaps from the position shown in Fig. 4 to that shown in Fig. 5. The contacts 15, 19 are now under mutual contact pressure because of the counter-pressure exerted on the casing rim by the tensioned bimetal disk 14. The result is that the circuit from cable lead 20 via the contacts 19, 15 and the arms of the metal spring or metal spider 22, 23 on the casing portion 12, to cable lead 21, is closed. The metal spider arms 22 and 23 are electrically connected, on the one hand, to the contact 15 of the bimetal disk 14, and, on the other hand, to the casing portion 12. By this flexible current conduction arrangement the bimetal disk 14 is electrically relieved of load, whereby, even in the case of relatively high loadings, sparking at its marginal contact points, and consequently destruction of the bimetal edge and its flanged mounting, is entirely obviated.

The preferably dust-proof and water-tight upper casing portion 16 may be provided with a central downwardly curved recess 24. This recess or curve 24 may be easily altered by pressure or by tapping, whereby the initial tension of the bimetal disk 14 is changed, and whereby consequently also the interval between the "on" and "off" positions can be adjusted.

Finally, after removing the upper casing portion 16 and after withdrawing the bimetal disk 14, the counter-contact 19 on the casing portion 12 may be made regulable relative to the contact 15 of the disk 14 by using insulating plates 18 of varying thickness, whereby likewise the initial tension of the bimetal disk and consequently also the contact pressure, can be varied.

The cable lead 21 may be attached alternatively to casing portion 16 on the opposite side of the casing instead of to casing portion 12, as shown. It should further be noted that the cable lead 20 should be rotatably fitted for the sake of ease in assembling.

Instead of employing only one counter-contact 19, a counter-contact may be arranged on either side of the contact 15 of the bimetal disk 14, so that the small thermostat may be employed also as reversing contact.

What I claim as new and desire to secure by Letters Patent of the United States is:

1. A small-type thermostat, particularly for preventing overheating in electrical apparatus as well as in winding coils of machinery or transformers, comprising, a casing of suitable shape and heat and current well-conducting metal; a curved bimetal disk adapted to conduct the current secured to the rim of said casing; a contact member of high-grade contact material fixedly mounted on said bimetal disc for movement therewith; a first electrical conductor secured to and electrically connected via said casing with said bimetal disk; a counter contact fixedly mounted on said casing opposite said contact member and insulated from said casing; and a second electrical conductor secured to said counter contact but insulated from said casing.

2. A small-type thermostat, particularly for preventing overheating in electrical apparatus as well as in winding coils of machinery or transformers, comprising, a lens-shaped, sealed, dust-proof and water-tight casing of heat and current well-conducting metal; a curved bimetal disk adapted to conduct current loosely secured in the rim of said casing; a contact member of high-grade contact material fixedly mounted on said bimetal disc for movement therewith; a first electrical conductor secured to and electrically connected via said casing with said bimetal disk; a counter contact fixedly mounted on said casing opposite said contact member and insulated from said casing; and a second electrical conductor secured to said counter contact but insulated from said casing.

3. A small-type thermostat as per claim 2, in which said contact member of said bimetal disk is a contact stud.

4. A small-type thermostat as per claim 2, in which at least one of said electrical conductors is rotatably secured to said casing.

5. A small-type thermostat as per claim 2, including a flexible current lead connecting said contact fixedly mounted on said bimetal disk with said casing for the purpose of relieving said bimetal disk of electrical load.

6. A small-type thermostat as per claim 2, including a flexible current lead connecting the contact of said bimetal disk with said casing for the purpose of relieving said bimetal disk of electrical load, said flexible current lead being a sun-wheel-shaped metal spider.

7. A small-type thermostat as per claim 2, including an insulating plate interposed between said counter contact and said casing, said insulating plate being variable in thickness for the adjustment of said counter contact at proper distance from said contact of said bimetal disk.

8. A small-type thermostat as per claim 2, in which the upper wall of said casing is provided with a central inwardly curved recess adapted to rest against the center of said bimetal disk behind the contact of the latter when said contact is in non-contact position, said recess being variable in depth for the adjustment of the proper initial tension of said bimetal disk.

References Cited in the file of this patent

UNITED STATES PATENTS

| | | |
|---|---|---|
| 2,732,461 | Huber | Jan. 24, 1956 |
| 2,753,422 | Mertler | July 3, 1956 |